(12) United States Patent
Choi

(10) Patent No.: US 12,297,933 B2
(45) Date of Patent: May 13, 2025

(54) CONNECTOR FOR PIPING

(71) Applicant: SNC CORPORATION CO., LTD., Incheon (KR)

(72) Inventor: Yuk Nam Choi, Bucheon-si (KR)

(73) Assignee: SNC CORPORATION CO., LTD., Incheon (KR)

( * ) Notice: Subject to any disclaimer, the term of this patent is extended or adjusted under 35 U.S.C. 154(b) by 0 days.

(21) Appl. No.: 18/277,465

(22) PCT Filed: Feb. 18, 2022

(86) PCT No.: PCT/KR2022/002401
§ 371 (c)(1),
(2) Date: Aug. 16, 2023

(87) PCT Pub. No.: WO2022/177338
PCT Pub. Date: Aug. 25, 2022

(65) Prior Publication Data
US 2024/0044427 A1 Feb. 8, 2024

(30) Foreign Application Priority Data
Feb. 18, 2021 (KR) .......................... 10-2021-0021531

(51) Int. Cl.
*F16L 19/00* (2006.01)
*F16L 19/06* (2006.01)

(52) U.S. Cl.
CPC .......... *F16L 19/005* (2013.01); *F16L 19/061* (2013.01)

(58) Field of Classification Search
CPC .............................. F16L 19/005; F16L 19/061
See application file for complete search history.

(56) References Cited

U.S. PATENT DOCUMENTS 4,475,748 A * 10/1984 Ekman ................... F16L 19/005
5,388,866 A * 2/1995 Schlosser ............. F16L 19/005
(Continued)

FOREIGN PATENT DOCUMENTS

CN      211880063 U     11/2020
JP      2015068447 A     4/2015
(Continued)

OTHER PUBLICATIONS

PCT International Search Report for International Application No. PCT/KR2022/002401, mailed May 17, 2022, 7pp.
(Continued)

*Primary Examiner* — Zachary T Dragicevich
(74) *Attorney, Agent, or Firm* — The Roy Gross Law Firm, LLC; Roy Gross

(57) ABSTRACT

A connector is provided for piping which may prevent a cap nut part from being automatically loosened or locked due to external force, such as an external vibration, a bump, or a shock, that i not deliberately applied, before a connector product is used, and in addition, may prevent an O-ring from being separated from the inside of the connector due to pressing caused by erroneous assembly in a pipe fastening process. To this end, the connector for piping comprises: a body part of a pipe body; the cap nut part; a collet part; and an anti-loosening part which prevents the cap nut part from being loosened or locked due to external force that is not deliberately applied.

10 Claims, 5 Drawing Sheets

(56) References Cited

U.S. PATENT DOCUMENTS

| | | | |
|---|---|---|---|
| 5,890,746 A * | 4/1999 | Mueller | F16L 19/005 |
| 2004/0056481 A1* | 3/2004 | Do | F16L 19/005 |
| 2004/0061329 A1* | 4/2004 | Guest | F16L 19/005 |
| 2006/0202478 A1* | 9/2006 | Guest | F16L 19/005 |
| 2011/0260450 A1* | 10/2011 | Imanishi | F16L 19/005 |

FOREIGN PATENT DOCUMENTS

| | | |
|---|---|---|
| KR | 20060098327 A | 9/2006 |
| KR | 200447466 Y1 | 1/2010 |
| KR | 20160143258 A | 12/2016 |
| KR | 2323543 B1 | 11/2021 |

OTHER PUBLICATIONS

PCT Written Opinion for International Application No. PCT/KR2022/002401, mailed May 17, 2022, 4pp.

\* cited by examiner

[FIG. 1]
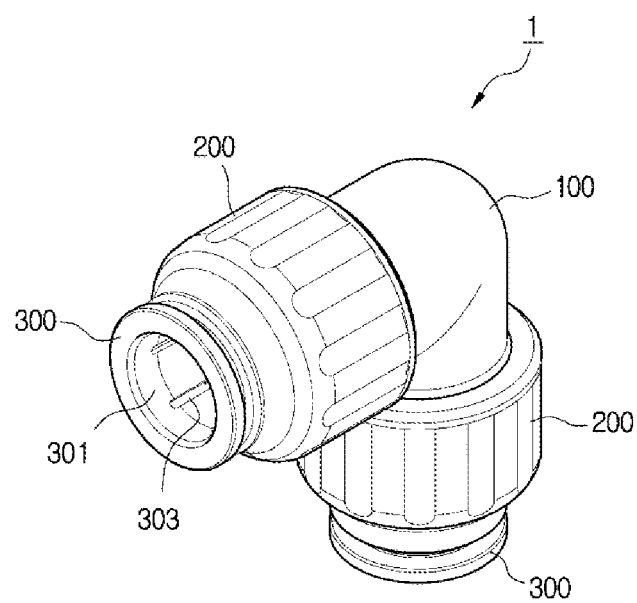
[FIG. 2]
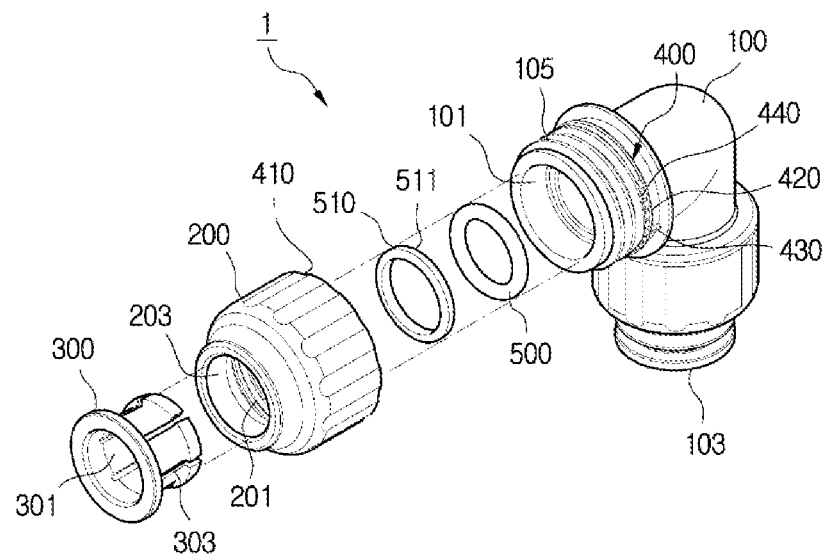

[FIG. 3]
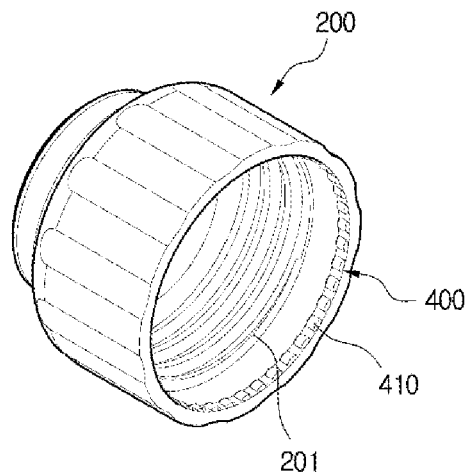
[FIG. 4]
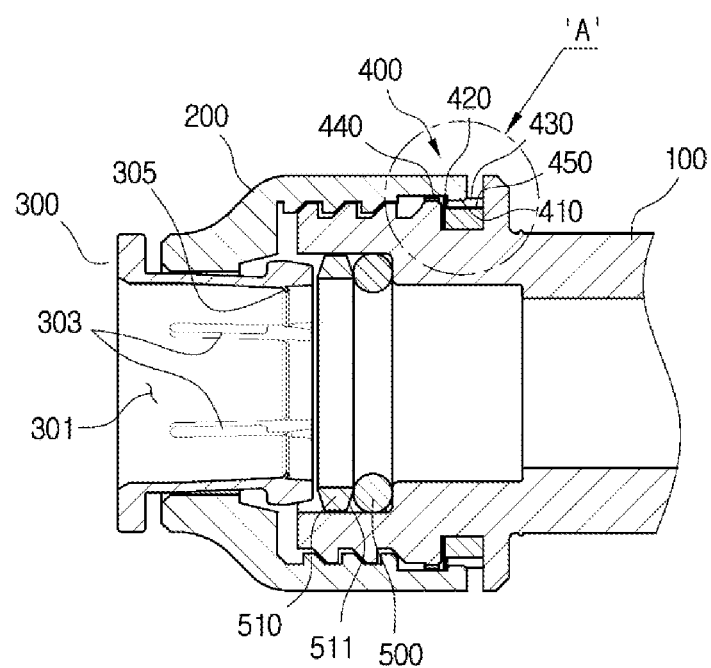

[FIG. 5]
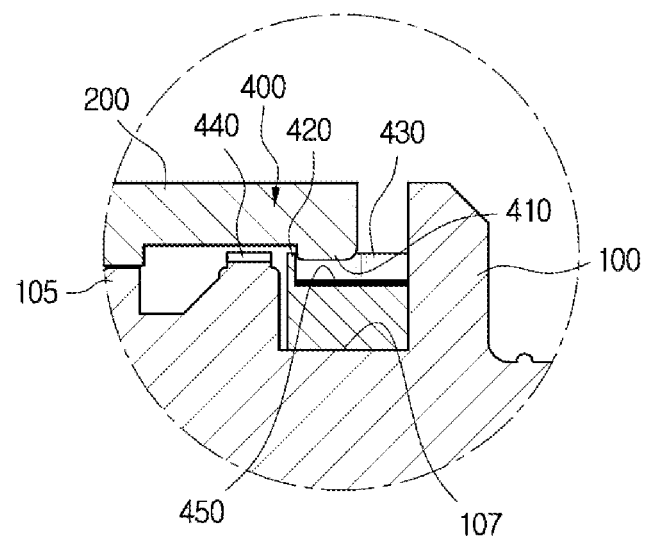
[FIG. 6]
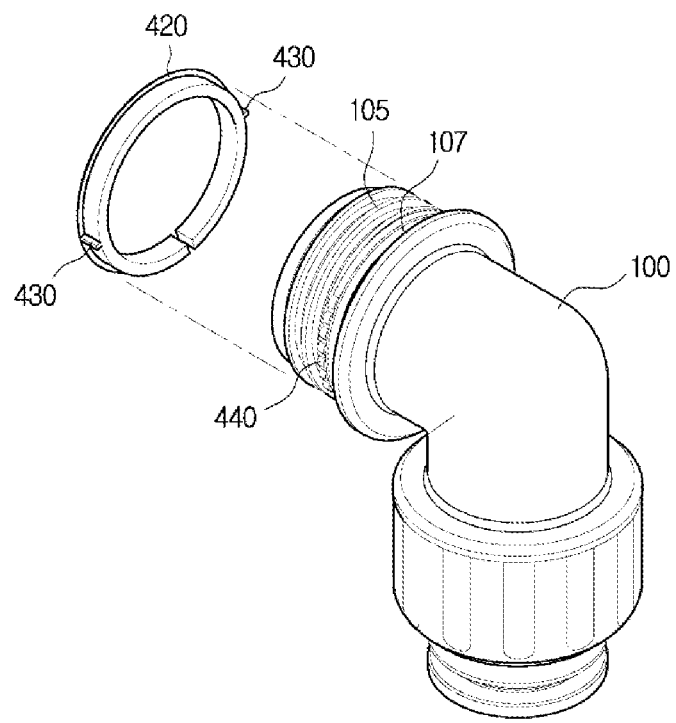

[FIG. 7]
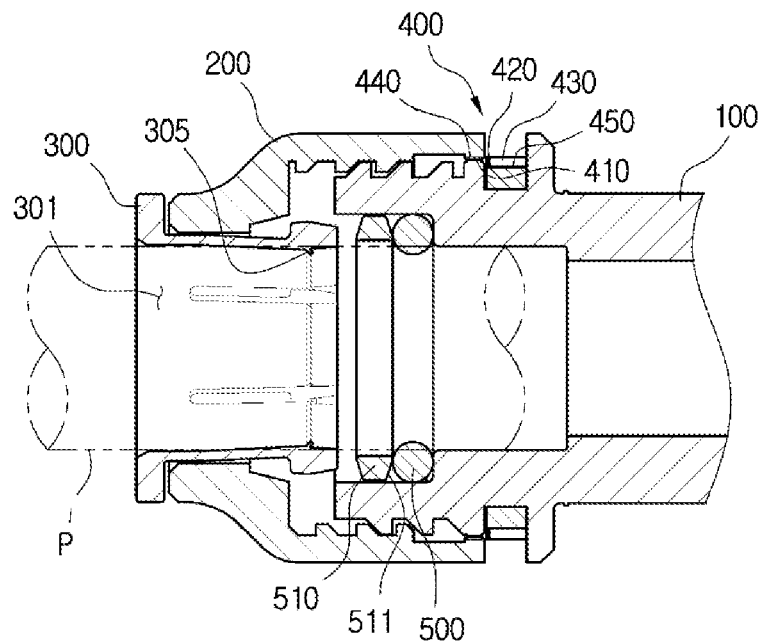
[FIG. 8]
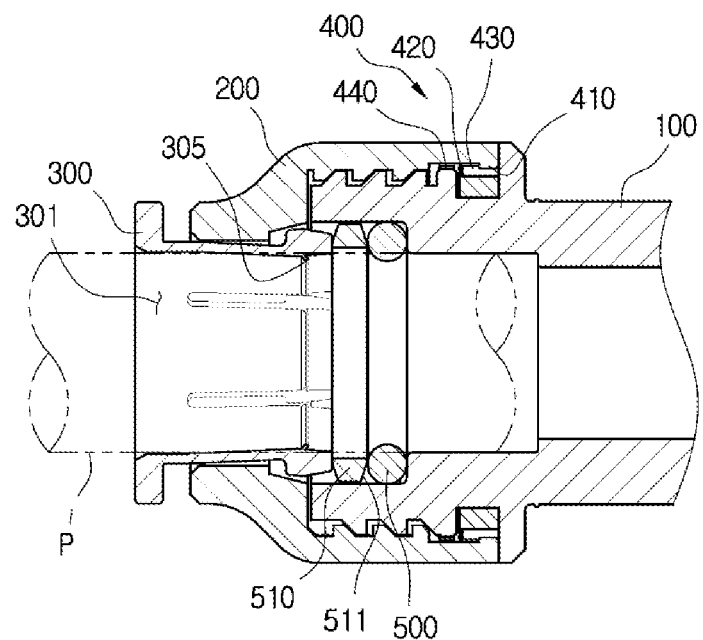

[FIG. 9]
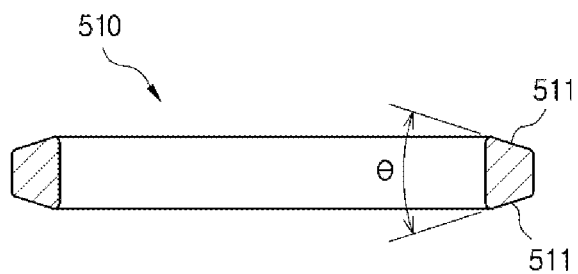
[FIG. 10]
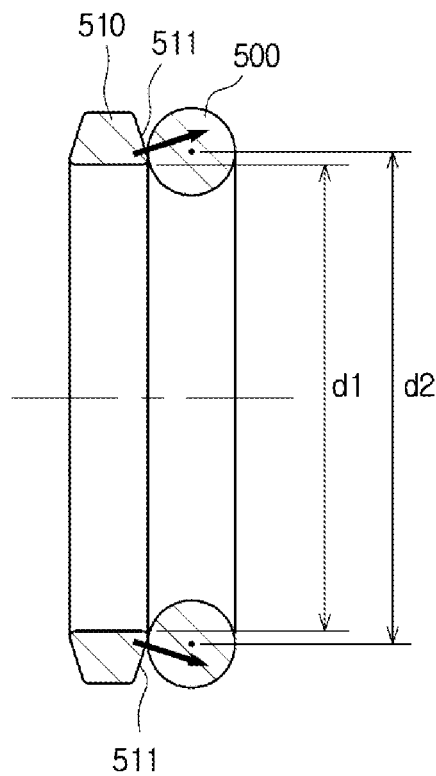

CONNECTOR FOR PIPING

CROSS REFERENCE TO RELATED APPLICATIONS

This application is a National Phase of PCT Patent Application No. PCT/KR2022/002401 having International filing date of Feb. 18, 2022, which claims the benefit of priority of Korean Patent Application No. 10-2021-0021531, filed Feb. 18, 2021, the contents of which are all incorporated herein by reference in their entirety.

TECHNICAL FIELD

The present disclosure relates to a connector for piping, and more specifically, relates to a connector for piping which may prevent a cap nut from being automatically loosened or locked before a connector product is used, and in addition, may prevent an O-ring from being removed from the inside of the connector due to pressing caused by erroneous assembly in a pipe fastening process.

BACKGROUND ART

In general, connectors are used to easily connect pipes to each other in houses, mobile/prefabricated houses, recreational vehicles or boats, flower/livestock farms, home appliances, and filter devices.

These connectors are mainly made of a synthetic resin material with heat resistance, pressure resistance, corrosion resistance and chemical resistance so that they may be used for warm water and hot water in the pipes.

Specifically, a conventional connector includes a body having a tubular shape and having one end connected to a pipe, and a collet which is screwed to an outer circumferential surface of the other end of the body via a cap nut, and into which another pipe is fixedly inserted. In addition, an O-ring is inserted into a connection gap between the body and the collet to maintain airtightness.

However, the conventional connector equipped with the cap nut may prevent the cap nut from being separated from the body because the cap nut is completely loosened. However, the conventional connector equipped with the cap may not prevent the cap nut from being locked by an external force which is not deliberately applied.

That is, it may happen that before the connector product is used, the cap nut is rotated by an external force that is not applied such as external vibration, collision, or impact, and thus is locked and fixed to the body. In this case, when the pipe is assembled to the connector with the cap nut locked due to the user's carelessness, the O-ring may be removed from the inside of the body due to erroneous assembly.

Furthermore, when the pipe is not properly inserted into the connector in a forward direction, when the pipes are connected to each other in a narrow space, or when fastening is performed by applying excessive force, the O-ring may be removed from the inside of the body due to incorrect assembly as described above.

DISCLOSURE

Technical Problem

The present disclosure is devised to solve the above-mentioned problems. Thus, a purpose of the present disclosure is to provide a connector for piping which may prevent a cap nut part from being automatically loosened or locked due to external force, such as an external vibration, a bump, or a shock, that is not deliberately applied, before a connector product is used, and in addition, may prevent an O-ring from being removed from the inside of the connector due to pressing caused by erroneous assembly in a pipe fastening process.

Technical Solution

A connector for piping according to the present disclosure for achieving the purpose as described above may include a body having a tubular shape and having an inlet and an outlet defined therein; a cap nut having one end screwed to an outer circumferential surface of the inlet or the outlet of the body; a collet fitted into an inner circumferential surface of the cap nut through an opening of the other end of the cap nut, wherein the collet presses and fixes an outer circumferential surface of a connection target pipe inserted into an inner receiving hole of the collect when the cap nut is screwed to the body; and an anti-loosening mechanism including: a stopped protrusion formed on an inner circumferential surface of one end of the cap nut; a stopper protrusion formed on an outer circumferential surface of the body, wherein the stopped protrusion is engaged with the stopper protrusion to prevent the cap nut screwed, at a predetermined position, to the body from being loosened therefrom under an external force not deliberately applied; and stopper ribs formed on the outer circumferential surface of the body and spaced from each other by a predetermined angular spacing, wherein the stopped protrusion is engaged with the stopper ribs to prevent the cap nut coupled to the body so as to be prevented from being loosened therefrom from being locked under an external force not deliberately applied.

In this case, the stopped protrusion may have a sawtooth shape, and the stopped protrusions may be arranged along the inner circumferential surface of the cap nut.

Further, the connector for piping may further include a friction-generating protrusion formed on an outer circumferential surface of the body at a position adjacent to the stopper protrusion in a direction from which the cap nut is loosened, wherein the friction-generating protrusion contacts the stopped protrusion to generate friction when the cap nut is rotated to be loosened.

Further, the stopper protrusion may be formed to have a thickness of 0.2 to 0.4 mm.

Further, each of the stopper ribs may be formed to have a thickness of 0.7 to 1 mm.

Further, the stopper protrusion and the stopper ribs may be formed on an outer circumferential surface of an anti-loosening ring provided as a separate structure and may be integrally formed with the anti-loosening ring, wherein the anti-loosening ring is received in a groove of the body.

Further, the connector for piping may further include an indicator of a predetermined color formed on a portion of the outer circumferential surface of the body on which the stopper ribs are formed, wherein the indicator allows a user to visually identify whether the cap nut is locked.

Further, the connector for piping may further include an O-ring seated on an inner circumferential surface of the body so as to block a gap between the inner circumferential surface of the body and the connection target pipe inserted through the receiving hole to maintain airtightness; and an insert ring disposed between the O-ring and a front end of the collet inserted into the cap, wherein the insert ring presses the O-ring to prevent the O-ring from being removed from the inner circumferential surface of the body when the cap nut is screwed to the body.

Further, the insert ring may have pressing surfaces, each being tapered at a predetermined angle so as to press the in a direction from a central axis of the body toward the inner circumferential surface of the body.

Further, the pressing surfaces may be respectively positioned symmetrically on both opposing side surfaces of the insert ring, wherein an angle between the symmetrically-positioned pressing surfaces is in a range of 25 to 35°.

Further, an inner diameter of the insert ring may be smaller than a diameter of a cross-sectional center of a body of the O-ring.

Advantageous Effects

The connector for piping according to the present disclosure having the above configuration includes the anti-loosening mechanism between the body and the cap nut so that the cap nut may be stopped and fixed at a predetermined position. Thus, before the connector product is used, the cap nut may be prevented from being loosened or locked by itself due to the external force such as vibration, impact, or collision which is not deliberately applied.

In addition, the insert ring equipped with the pressure surface at a predetermined angle may be inserted into the body into which the pipe P is inserted, thereby preventing the O-ring from being removed from the inside of the body due to the pressing due to incorrect assembly during the fastening process of the pipe.

DESCRIPTION OF DRAWINGS

FIG. 1 is a perspective view of a connector for piping according to the present disclosure.

FIG. 2 is an exploded perspective view of a connector for piping according to the present disclosure.

FIG. 3 is a perspective view of a cap nut according to the present disclosure.

FIG. 4 is a cross-sectional side view of a connector for piping according to the present disclosure.

FIG. 5 is a detailed view of an 'A' portion of FIG. 4.

FIG. 6 is an exploded perspective view showing a combined structure of a stopper rib and a stopper protrusion according to the present disclosure.

FIG. 7 is a side cross-sectional view showing a state before the connector for piping according to the present disclosure is used.

FIG. 8 is a side cross-sectional view showing a fully locked state of a cap nut after the pipe is inserted into the connector for piping according to the present disclosure.

FIG. 9 is a side cross-sectional view of an insert ring according to the present disclosure.

FIG. 10 is a cross-sectional side view showing a state in which the insert ring presses an O-ring according to the present disclosure.

BEST MODE

In the best mode, the present disclosure provides:
a connector for piping according to the present disclosure for achieving the purpose as described above may include a body having a tubular shape and having an inlet and an outlet defined therein; a cap nut having one end screwed to an outer circumferential surface of the inlet or the outlet of the body; a collet fitted into an inner circumferential surface of the cap nut through an opening of the other end of the cap nut, wherein the collet presses and fixes an outer circumferential surface of a connection target pipe inserted into an inner receiving hole of the collect when the cap nut is screwed to the body; and an anti-loosening mechanism including: a stopped protrusion formed on an inner circumferential surface of one end of the cap nut; a stopper protrusion formed on an outer circumferential surface of the body, wherein the stopped protrusion is engaged with the stopper protrusion to prevent the cap nut screwed, at a predetermined position, to the body from being loosened therefrom under an external force not deliberately applied; and stopper ribs formed on the outer circumferential surface of the body and spaced from each other by a predetermined angular spacing, wherein the stopped protrusion is engaged with the stopper ribs to prevent the cap nut coupled to the body so as to be prevented from being loosened therefrom from being locked under an external force not deliberately applied, the stopper protrusion and the stopper ribs may be formed on an outer circumferential surface of an anti-loosening ring provided as a separate structure and may be integrally formed with the anti-loosening ring, wherein the anti-loosening ring is received in a groove of the body.

[Mode]

Hereinafter, with reference to the accompanying drawings, a detailed description of a configuration and an operation of specific embodiments of the present disclosure is as follows.

Herein, it should be noted that in adding reference numerals to components of each drawing, the same components are marked with the same numerals as much as possible, even when they are shown on different drawings.

Further, in describing the present disclosure, a detailed description of a related known function or configuration is omitted in order not to obscure the gist of the present disclosure.

Furthermore, when a part includes a certain component, this means that the part may further include another component unless otherwise stated.

FIG. 1 is a perspective view of a connector for piping according to the present disclosure, FIG. 2 is an exploded perspective view of a connector for piping according to the present disclosure, and FIG. 3 is a perspective view of a cap nut according to the present disclosure.

Referring to FIG. 1 to FIG. 3, a connector 1 for piping according to a preferred embodiment of the present disclosure may include a body 100, a cap nut 200, a collet 300, and an anti-loosening mechanism 400.

A detailed description of each of the components of the present disclosure is as follows.

First, the body 100 constitutes a main body of the connector 1, and may have a tubular shape and may be made of a synthetic resin. In this case, an inlet 101 may be defined in one end of the body 100, and an outlet 103 may be defined in the other end of the body 100.

The body 100 may be formed in an 'I' shape or may be formed in an 'L' shape to allow a direction in which connection target pipes P are connected to each other to be easily changed. In the present disclosure, an example where the body 100 is formed in the 'L' shape is shown and described. However, the present disclosure is not limited thereto.

The cap nut 200 may connect the connection target pipe P (hereinafter, abbreviated as a pipe) to the inlet 101 or the outlet 103 of the body 100. In this case, a thread 201 (see FIG. 3) may be formed on an inner circumferential surface of one end of the cap nut 200 so as to be screwed into a thread 105 of an outer circumferential surface of the body 100. Further, an opening 203 may be formed in the other end of the cap nut 200 so that the collet 300 to be described later may be inserted into the opening.

Referring to FIG. 4, the collet 300 is fitted into the inner circumferential surface of the cap nut 200 through the opening 203 of the cap nut 200. The collet 300 may fixedly press an outer circumferential surface of the pipe P (see FIG. 8) inserted into an inner receiving hole 301 when the cap nut 200 is screwed to the body.

Specifically, the collet 300 may have a plurality of cut grooves 303 defined therein so that when the pipe is inserted into the inner receiving hole 301, legs defined by the cut grooves may be displaced toward a central axis of the body 100 or in a direction away from the central axis of the body 100. Further, a pressing protrusion 305 may be formed on the inner circumferential surface of the collet 300 in which the cut groove 303 is formed.

That is, when the cap nut 200 is screwed to the body, the inner circumferential surface of the cap nut 200 presses the outer circumferential surface of one end of the collet 300 having the above structure. Thus, the pressing protrusion 305 formed on the inner circumferential surface of the collet 300 presses the outer circumferential surface of the pipe P inserted into the receiving hole 301, thereby fixing the pipe P.

The anti-loosening mechanism 400 is provided between the body 100 and the cap nut 200. This anti-loosening mechanism 400 may prevent the cap nut 200 screwed, at a predetermined point, to the body 110 from being loosened or locked by an external force which is not deliberately applied, in a state where the pipe P is not inserted into the inner receiving hole 301 of the collet 300.

Specifically, referring to FIG. 5, the anti-loosening mechanism 400 includes a stopped protrusion 410 formed on the inner circumferential surface of one end of the cap nut 200, and a stopper protrusion 420 on the outer circumferential surface of the body 100. The stopped protrusion 410 may be engaged with the stopper protrusion 420 so as to prevent the cap nut 200 screwed, at a predetermined point, to the body 100 from being loosened by an external force which is not deliberately applied. In this case, the stopped protrusions 410 may be arranged on and along the inner circumferential surface of the cap nut 200 so as to be spaced apart from each other by a predetermined angular spacing, and may have a sawtooth shape (See FIG. 3).

In addition, the anti-loosening mechanism 400 may include a stopper rib 430 formed on the outer circumferential surface of the body 100. The stopper ribs 430 may be arranged so as to be spaced apart from each other by a predetermined angular spacing. The stopped protrusion 410 may be engaged with the stopper rib 430 to prevent the cap nut 200 coupled to the body so as to be prevented from being loosened due to the stopper protrusion 420 from being locked while being rotated by an external force which is not deliberately applied.

Referring to FIG. 6, a plurality of stopper ribs 430 may be arranged on and along the outer circumferential surface of the body 100 and may be spaced apart from each other by a predetermined angular spacing. In the present disclosure, an example in which the two stopper ribs 430 are spaced apart from each other by a predetermined angular spacing is shown and described.

In another example, the stopper protrusion 420 and the stopper rib 430 may be integrally formed with an outer circumferential surface of an anti-loosening ring provided as a separate structure which may be inserted into a groove 107 defined in the outer circumferential surface of the body 100.

In this case, the stopper protrusion 420 may be formed to have a thickness of 0.2 to 0.4 mm. That is, when the thickness of the stopper protrusion 420 is smaller than 0.2 mm, the stopper protrusion may be easily bent. Conversely, when the thickness of the stopper protrusion 420 is larger than 0.4 mm, the rotation of the cap nut 200 may not be possible because the stopper protrusion 420 is too thick.

The stopper rib 430 may be formed to have a thickness of 0.7 to 1 mm. That is, when the thickness of the stopper rib 430 is smaller than 0.7 mm, the rib may not prevent the cap nut 200 from being rotated by an external force which is not deliberately applied because the rib is too thin. Conversely, when the thickness of the stopper rib 430 is larger than 1 mm, the rotation of the cap nut 200 may not be possible as the rib 430 is too thick.

In one example, referring to FIG. 5 again, a friction-generating protrusion 440 may be formed on the outer circumferential surface of the body 100 at a position adjacent to the stopper protrusion 420 in a direction which the cap nut 200 is loosened. The friction-generating protrusion 440 may contact the stopped protrusion 410 so as to generate friction during the unwinding rotation of the cap nut 200 for inserting the connection target pipe P into the receiving hole 301. Accordingly, the user may estimate a proper position at which the cap nut 200 starts to be loosened, based on a feeling of the contact between the stopped protrusion 410 and the friction generating protrusion 440.

Furthermore, an indicator 450 of a predetermined color may be provided around a portion of the outer circumferential surface of the body where the stopper rib 430 is formed such that a user visually identifies whether or not the cap nut 200 is locked. In this case, the indicator 450 may be painted thereon in a conspicuous fluorescent color or other various colors for easy identification with the naked eye.

Referring to FIG. 7, the connector 1 equipped with the anti-loosening mechanism 400 having the above structure should allow the cap nut 200 to be positioned at a predefined position so as not to press the outer circumferential surface of the collet 300 so that the pipe P may be fitted into the receiving hole 301. That is, the pipe P may be smoothly inserted into the receiving hole 301 only when the stopped protrusion 410 is positioned so as to be caught by the friction-generating protrusion 440.

In this case, a portion of the outer circumferential surface of the body 100 having the indicator 430 thereon is exposed to the outside. Accordingly, when the indicator 450 is visible to the naked eye of the user before the connector 1 is used, the user may determine that the pipe P may be inserted into the receiving hole 301.

Conversely, when the indicator 450 is not visible to the user before the connector 1 is used, the user may determine that the cap nut 200 is completely locked. Therefore, the user may unwind the cap nut 200 so that the indicator 450 may be visible to the user, and thus may position the stopped protrusion 410 to a predetermined point so that the stopped protrusion 410 is caught on the friction-generating protrusion 440, and then may insert the pipe P into the receiving hole 301.

When the pipe P is inserted into the receiving hole 301 of the connector 1, the user may displace the cap nut 200 so as to be completely locked as shown in FIG. 8. At the same time, the pressing protrusion 305 of the inner circumferential surface of the collet 300 presses the outer circumferential surface of the pipe P, so that a position to which the pipe P is inserted may be fixed.

In an example, an O-ring 500 may be seated on the inner circumferential surface of the body 100 so as to maintain airtightness by blocking a gap between the inner circumferential surface of the body 100 and the pipe P inserted through the receiving hole 301. In addition, an insert ring 510 may be disposed between the O-ring 500 and a front end of the collet 300 inserted into the cap nut.

The insert ring 510 may press the O-ring 500 to prevent the O-ring 500 from escaping from the inside of the body when the cap nut 200 is screwed to the body. The insert ring 510 may have a pressing surface 511 which may be formed to be tapered at a predetermined angle to press the O-ring 500 in a direction from the central axis of the body 100 toward the inner circumferential surface of the body 100.

Referring to FIG. 9, the pressing surfaces 511 may be respectively symmetrically formed on both side surfaces of the insert ring 510 to prevent erroneous assembly of the insert ring 510. In this case, an angle θ between the symmetrically-formed two pressing surfaces 511 may be in a range of 25 to 35°.

That is, when the angle θ between the two pressing surfaces 511 is smaller than 25°, there is a concern that the 500 being pressed may escape into the receiving hole 301. Conversely, when the angle θ between the pressing surfaces 511 is larger than 35°, the legs of the collet 300 extend outwardly to a position displaced downwardly by the angle, and thus an amount by which the legs bite the pipe P is reduced, so that the pipe P may be removed from the connector.

Referring to FIG. 10, an inner diameter d1 of the insert ring 510 may be smaller than a diameter d2 of a cross-sectional center of a body of the O-ring 500 (d1<d2). Accordingly, the pressing surface 511 including an edge of an inner circumferential surface of the insert ring 510 may press the O-ring 500 toward the inner circumferential surface of the body 100 in a direction inclined at a predetermined angle.

The connector 1 for piping according to the present disclosure having the above configuration includes the anti-loosening mechanism 400 between the body 100 and the cap nut 200 so that the cap nut 200 may be stopped and fixed at a predetermined position. Thus, before the connector 1 product is used, the cap nut 200 may be prevented from being loosened or locked by itself due to the external force such as vibration, impact, or collision which is not deliberately applied.

In addition, the insert ring 510 equipped with the pressure surface 511 at a predetermined angle may be inserted into the body 100 into which the pipe P is inserted, thereby preventing the O-ring 500 from being removed from the inside of the body due to the pressing due to incorrect assembly during the fastening process of the pipe P.

The present disclosure has been illustrated and described above based on a specific embodiment. However, the present disclosure is not limited to the above embodiment, and various changes and modifications are possible within the scope of the technical spirit of the present disclosure.

The invention claimed is:
1. A connector for piping comprising:
a body having a tubular shape and having an inlet and an outlet defined therein;
a cap nut having one end screwed to an outer circumferential surface of the inlet or the outlet of the body;
a collet fitted into an inner circumferential surface of the cap nut through an opening of another end of the cap nut, wherein the collet presses and fixes an outer circumferential surface of a connection target pipe inserted into an inner receiving hole of the collect collet when the cap nut is screwed to the body; and
an anti-loosening mechanism including:
stopped protrusions formed on an inner circumferential surface of one end of the cap nut;
a stopper protrusion formed on an outer circumferential surface of the body, wherein the stopped protrusion is engaged with the stopper protrusion to prevent the cap nut screwed, at a predetermined position, to the body from being loosened therefrom under an external force; and
stopper ribs formed on the outer circumferential surface of the body and spaced from each other by a predetermined angular spacing, wherein the stopped protrusion is engaged with the stopper ribs to prevent the cap nut coupled to the body from being loosened or locked under an external force,
wherein the body includes an anti-loosening ring which is provided as a separate structure and received in a groove of the body, and the stopper protrusion and the stopper ribs are formed on an outer circumferential surface of the anti-loosening ring and are integrally formed with the anti-loosening ring such that the stopper protrusion and the stopper ribs are received in the groove of the body.

2. The connector for piping of claim 1, wherein each of the stopped protrusions has a sawtooth shape, and the stopped protrusions are arranged along the inner circumferential surface of the cap nut.

3. The connector for piping of claim 1, further comprising a friction-generating protrusion formed on an outer circumferential surface of the body at a position adjacent to the stopper protrusion in a direction from which the cap nut is loosened, wherein the friction-generating protrusion contacts the stopped protrusion to generate friction when the cap nut is rotated to be loosened.

4. The connector for piping of claim 1, wherein the stopper protrusion is formed to have a thickness of 0.2 to 0.4 mm.

5. The connector for piping of claim 1, wherein each of the stopper ribs is formed to have a thickness of 0.7 to 1 mm.

6. The connector for piping of claim 1, further comprising an indicator of a predetermined color formed on a portion of the outer circumferential surface of the body on which the stopper ribs are formed, wherein the indicator allows a user to visually identify whether the cap nut is locked.

7. The connector for piping of claim 1, further comprising:
an O-ring seated on an inner circumferential surface of the body so as to block a gap between the inner circumferential surface of the body and the connection target pipe inserted through the receiving hole to maintain airtightness; and
an insert ring disposed between the O-ring and a front end of the collet inserted into the cap, wherein the insert ring presses the O-ring to prevent the O-ring from being removed from the inner circumferential surface of the body when the cap nut is screwed to the body.

8. The connector for piping of claim 7, wherein the insert ring has pressing surfaces, each being tapered at a predetermined angle so as to press the O-ring in a direction from a central axis of the body toward the inner circumferential surface of the body.

9. The connector for piping of claim 8, wherein the pressing surfaces are respectively positioned symmetrically on both opposing side surfaces of the insert ring, wherein an angle between the symmetrically-positioned pressing surfaces is in a range of 25 to 35°.

10. The connector for piping of claim 8, wherein an inner diameter of the insert ring is smaller than a diameter of a cross-sectional center of a body of the O-ring.

\* \* \* \* \*